United States Patent [19]
Giles et al.

[11] Patent Number: 6,070,218
[45] Date of Patent: May 30, 2000

[54] INTERRUPT CAPTURE AND HOLD MECHANISM

[75] Inventors: Christopher M. Giles, Lafayette, Colo.; Hartvig Eckner, Holte, Denmark

[73] Assignee: LSI Logic Corporation, Milpitas, Calif.

[21] Appl. No.: 09/007,913

[22] Filed: Jan. 16, 1998

[51] Int. Cl.⁷ ...................................................... G06F 9/46
[52] U.S. Cl. .......................... 710/260; 710/261; 710/262; 710/266; 710/267
[58] Field of Search .................................. 710/260, 262, 710/267, 266, 261

[56] References Cited

U.S. PATENT DOCUMENTS

| | | | |
|---|---|---|---|
| 4,222,103 | 9/1980 | Chamberlin | 713/600 |
| 4,488,227 | 12/1984 | Miu et al. | 712/244 |
| 4,491,912 | 1/1985 | Kainaga et al. | 712/243 |
| 4,498,136 | 2/1985 | Sproul, III | 710/262 |
| 5,359,715 | 10/1994 | Heil et al. | |
| 5,809,309 | 9/1998 | Leach et al. | 710/260 |
| 5,907,714 | 5/1999 | Boutaud et al. | 712/1 |

OTHER PUBLICATIONS

Frantz et al., "The Texas Instruments TMS320C25 Digital Signal Microcomputer," IEEE Micro, No. 6, Dec. 1986, pp. 10–27.

*Primary Examiner*—Ayaz R. Sheikh
*Assistant Examiner*—Frantz B. Jean
*Attorney, Agent, or Firm*—Conley, Rose & Tayon, PC; B. Noel Kivlin

[57] ABSTRACT

A processor is provided with an interrupt capture and hold mechanism. In one embodiment, a processor includes an instruction pipeline having stages for executing instructions. In the event of an exception, the instructions in the pipeline are flushed or aborted. This requires that each stage in the pipeline receive and respond to an exception-causing signal. An interrupt is an exception causing signal which may be provided by circuitry external to the processor. To ensure that such a signal is asserted long enough for each stage in the pipeline to receive and respond to it, all external hardware interrupts are routed through an interrupt capture and hold mechanism, thereby advantageously preventing the causation of an undefined processor state with little added complexity.

17 Claims, 4 Drawing Sheets

INTERRUPT CAPTURE AND HOLD MECHANISM

BACKGROUND OF THE INVENTION

1. Field of the Invention

This invention relates to the field of processors for data-processing systems, and in particular to a method for increasing the robustness of an interrupt handling mechanism.

2. Description of the Related Art

In a data-processing system the basic logical arithmetic computational operations are performed by the processor. The processors use a processor core operating under control of program instruction words, which when decoded serve to generate control signals to control the different elements within the processor core to perform the necessary functions to achieve the processing specified in the program instruction word. For this purpose there is provided within the processor core a number of registers and logic circuits. The processor registers are used to receive, hold, and transmit information (data and instructions) used by the processor. Several different types of registers are provided within the typical processor core. For example, an accumulator register temporarily stores data and accumulates the results of logical or arithmetic operations. A program counter stores the address of the next instruction in memory to be executed. An instruction register stores the instruction code (also known as the operation code) portion of instruction which is currently being executed by the processor, and an address register or data counter stores the operand portion of the currently executing instruction.

The processor executes the instructions of a program in a sequence known as a program control flow. As the processor moves through the program control flow, it performs the functionality specified by the program. The processor is designed to move through the program control flow in a manner specified by the program, except when an exception occurs. Exceptions cause the processor to (a) mark the current point in the program control flow, and (b) start executing an exception routine. Possible triggers of an exception include illegal conditions in the processor and processor interrupts. If one of these triggers occurs, it is desired that the processor attempt to resolve the exception, and the manner for resolving the exception is specified by the exception routine. The exception routine often begins by determining the source of the exception then taking appropriate action. Typically this involves storing the contents of the registers and invoking a handling routine which is designed to handle the source of the exception. For interrupts, the handling routines typically treat the interrupt as a request for a desired service, perform the service, and then cause the processor to return to the marked point in the program control flow. For illegal conditions, the handling routines may halt the program or search for a specified corrective action to take.

At any given instant in complex or pipelined processors, multiple modules of the processor can be actively involved in the executing of the program control flow, and each must be notified when an exception trigger occurs before the transfer of control to the exception routine can be fully accomplished. The notification mechanism to these modules can be different, and a spurious assertion of an exception trigger (i.e. an interrupt) may cause some modules to be notified while others are not. If any of these modules is not notified, the processor enters an undefined state. It is desirable to prevent this from happening without redesigning the carefully optimized asynchronous interaction between the various modules.

SUMMARY OF THE INVENTION

The problems outlined above are in large part solved by a processor which includes an interrupt capture and hold mechanism. In one embodiment, a processor includes an instruction pipeline having stages for executing instructions. In the event of an exception, the instructions in the pipeline are flushed or aborted. This requires that each stage in the pipeline receive and respond to an exception-causing signal. An interrupt is an exception-causing signal which may be provided by circuitry external to the processor. To ensure that such a signal is asserted long enough for each stage in the pipeline to receive and respond to it, all external hardware interrupts are routed through an interrupt capture and hold mechanism, thereby advantageously preventing the causation of an undefined processor state with little added complexity.

Broadly speaking, the present invention contemplates a processor which robustly handles interrupt requests. The processor comprises an interrupt acceptance module, a program counter register, and an interrupt handler. The interrupt acceptance module is configured to provide a global interrupt signal and is configured to latch global interrupt signal in an asserted state if an enabled interrupt is asserted while the capture signal is asserted. The program register is configured to specify an address of an instruction to be executed. The interrupt handler is coupled to the interrupt acceptance module to receive the global interrupt signal and is coupled to the program counter register to responsively store a return instruction address from the program counter register and to responsively provide an interrupt instruction address to the program counter register. The capture signal may be a clock signal.

The present invention further contemplates a method for asserting a global interrupt signal. The method comprises: (i) receiving an interrupt pin signal; (ii) masking the interrupt pin signal with an enable interrupt pin signal to determine an enabled interrupt signal; (iii) suppressing the enabled interrupt signal if an interrupt suppression signal is asserted to determine an unsuppressed interrupt signal; (iv) combining the unsuppressed interrupt signal with a detected interrupt signal to determine an accepted interrupt signal; (v) conditioning the accepted interrupt signal upon at least one condition signal to determine a detectable interrupt signal; (vi) latching the detectable interrupt signal upon receipt of a capture signal to determine the detected interrupt signal; and (vii) asserting the global interrupt signal if the accepted interrupt signal is asserted.

BRIEF DESCRIPTION OF THE DRAWINGS

Objects and advantages of the invention will become apparent upon reading the following detailed description and upon reference to the accompanying drawings in which.

Figure 1:
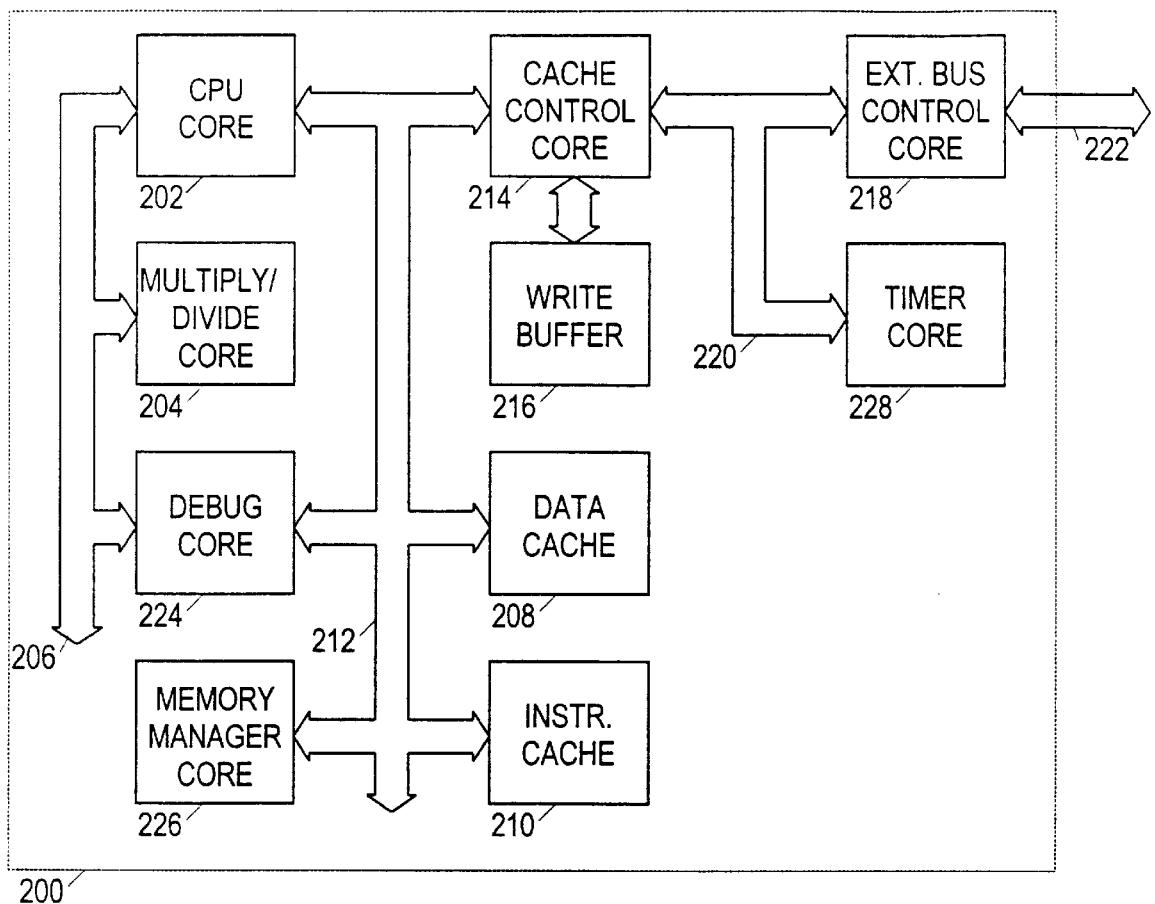
FIG. 1 is a functional block diagram of an exemplary custom integrated circuit which includes a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Custom-designed integrated circuits often involve a prohibitive amount of design effort which it is desirable to minimize. One popular method of reducing design costs is to use a set of pre-designed core modules, or "cores", which implement standard functions and which may be mixed and matched by customers to obtain a custom-designed integrated circuit with the desired functionality. A block diagram of an exemplary custom-designed circuit is shown in FIG. 1. By choosing cores from a set of predefined core modules, a system designer is able to quickly create an ASIC for nearly any desired purpose.

With reference to FIG. 1, should a designer wish to create a programmable multi-axis servo-controller ASIC 200 (for example), he could take a high-speed RISC core 202 and augment it with a multiply/divide core 204 using an extension of an internal CPU bus 206. A data cache 208 and an instruction cache 210 may be coupled to the CPU core 202 via a local CPU bus 212 to provide support for the high-speed RISC core. A cache controller 214 would then also be coupled to local CPU bus 212 and perhaps supported with a write buffer 216. An external bus control core 218 would be used to couple an on-chip system bus 220 with an off-chip system bus 222 for access to external memory chips, sensors, and control line drivers. Additional cores may be incorporated to provide other features. The debug core 224 designed to assist in system debugging may be built into the ASIC 200. Memory management features may be provided with a memory manager core 226, and space permitting, an on-chip timer core 228 may be provided. While this is but one example of the use of processor cores, it illustrates the utility and environment for which processor integrated circuits are being designed.

Microprocessors, microcontrollers, digital signal processors, and processor cores in general, respond to external signals called interrupts that exist to interrupt the current execution stream and force another stream to be entered. The interruption of the current execution stream is known as an exception. An interrupt capture and hold mechanism is described below which will capture and hold the assertion of this signal until the exception occurs. Once an exception occurs, the interrupt signal may be de-asserted, regardless of whether the interrupt actually caused the exception or not. This interrupt capture and hold mechanism will assure correct device operation even if the interrupt signal is removed while the exception is being taken. In order to more clearly explain the operation of the interrupt capture and hold mechanism, a specific exemplary processor architecture is now described.

Figure 2:
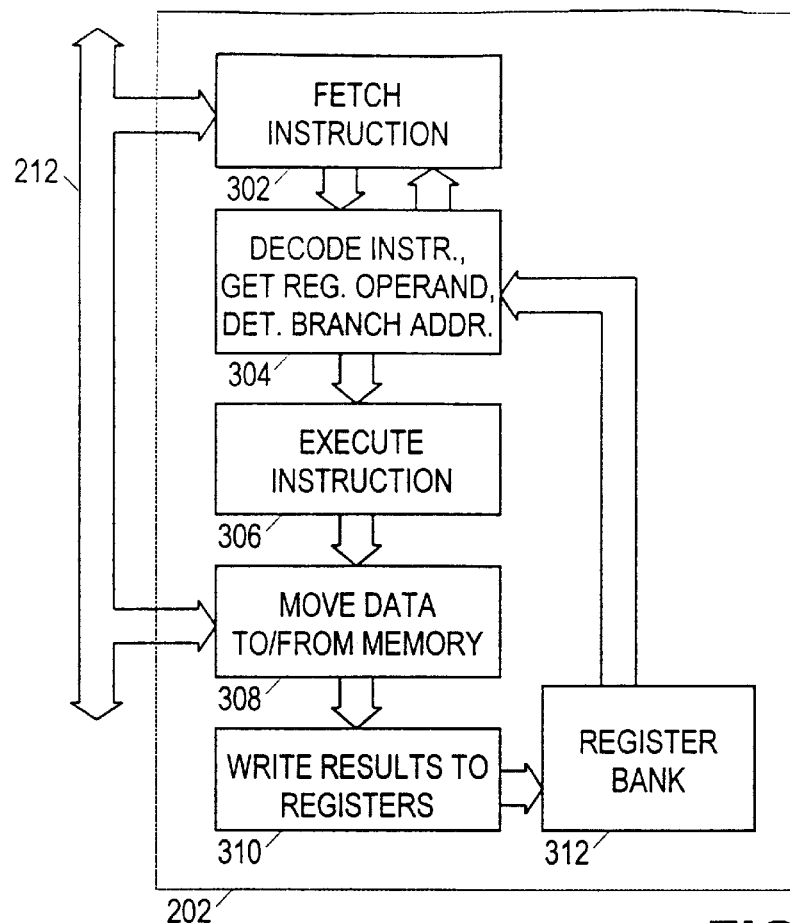
FIG. 2 is a functional block diagram of a pipelined processor core.

Turning now to FIG. 2, a pipelined processor core 202 is shown. Processor core 202 advantageously provides for interrupt capture and holding. In one embodiment, the processor core 202 includes fetch unit 302, a decode unit 304, an execute unit 306, a memory access unit 308, a write-back unit 310, and a register bank 312. The fetch unit 302, the decode unit 304, the execute unit 306, the memory access unit 308, and the write back unit 310 cooperate together to form an instruction execution pipeline.

Pipelining is an implementation technique whereby multiple instructions are simultaneously overlapped in execution. It provides a method for improving the efficiency and execution speed of the CPU. In a pipeline structure, instructions enter at one end—are processed through the stages or pipe segments—and exit at the other end. Each of the stages of the pipeline completes a part of the instruction.

The fetch unit 302 includes a program counter which indicates the memory address of the next instruction to be fetched. The fetch unit 302 retrieves the indicated instruction during a first pipeline cycle by accessing the local CPU bus 212. At the beginning of the next pipeline cycle, the instruction is provided to decode unit 304.

The decode unit 304 receives a fetched instruction, identifies operands of the native instruction and produces control information which indicates how to carry out an operation specified by the fetched instruction. Operands which may be identified by decode unit 304 include literal values provided within the fetched instruction and register operands. Identified register operand values are retrieved from register bank 312, and the fetched instruction is converted into control signal form for use by execute unit 306. Decode unit 304 provides the control information along with the identified operands to execute unit 306. During the second pipeline cycle, decode unit 304 also determines if the fetched instruction represents a jump or a potential branch, and if so, it calculates the address of the target instruction using immediate operands of the instruction and register values, and provides the target address to the fetch instruction module 302. Decode unit 304 may detect register dependencies on results of instructions which have not yet exited the pipeline, and be accordingly configured to stall fetch unit 302 until the needed register values are provided.

During the subsequent pipeline cycle, execute module 306 carries out arithmetic and/or logical operations necessary to implement the desired operation. The results produced by execute module 306 are provided to memory access module 308 at beginning of the next pipeline cycle. If the native operation does not indicate a memory access, memory access module 308 merely acts as a temporary holding register. Otherwise, memory access module 308 provides data to or retrieves data from local CPU bus 212. In the following pipeline cycle, write back module 310 takes the output from memory access module 308 and uses it to update register bank 312.

In one embodiment, an exception-causing signal instructs each of the various pipeline stages to abort their operations, and the fetch stage begins retrieval of the first instruction of the exception handling routine. In implementations without a capture mechanism, the interrupt signal is fed directly into the exception generating logic (the logic that nulls the current execution stream by generating exception signals), so that the interrupt is required to be asserted and held until the cause of the interrupt is resolved. Not all interrupt generators driving the interrupt signals can guarantee that the signal is never spuriously asserted then removed, as might occur in a case were no interrupt is intended. Since the interrupt is not held after assertion, some of the exception generating logic may be triggered while other parts may not. This may cause the processor to enter an indeterminate and non-deterministic state. Although this situation is brought about via improper and illegal assertion of the interrupt signal, the processor nevertheless should be able to tolerate the illegal assertion of input pins. Entering an undetermined state is not a desirable functional behavior.

Figure 3:
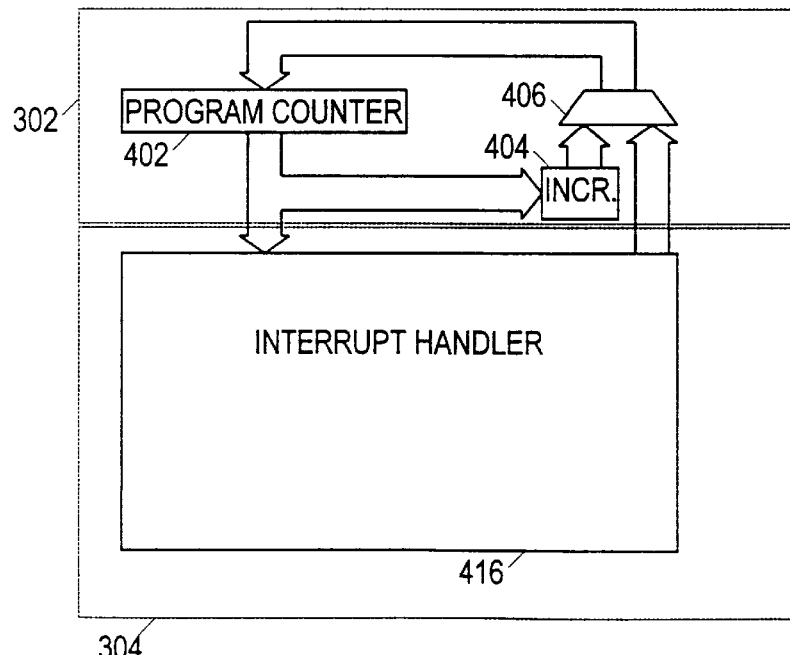
FIG. 3 is a functional block diagram of an interrupt handler aspect of a pipelined processor core.

Turning now to FIG. 3, additional functional blocks of processor core 202 are shown. A program counter register 402, which specifies the address of the instruction being fetched, is shown as part of fetch unit 302. The program counter register 402 is provided with an incrementer 404 which generates the address of the instruction immediately following the instruction being fetched. A multiplexer 406 provides to the fetch counter 402 the address of the next instruction to be fetched. Normally this will be the address provided by incrementer 404 unless another target address is provided (i.e. a branch address or an exception address).

FIG. 3 also shows an interrupt handler 416 as a part of decode unit 304. Interrupt handler 416 may include a program counter register chain to track addresses of instructions in various pipeline stages. In one embodiment, the interrupt handler includes circuitry coupled to the registers in the program counter register chain to determine a current instruction address before initiating the transfer of control to an exception handling routine. Instruction handler 416 provides an exception routine address to program counter register 402 via multiplexer 406. The exception routine may be configured to determine the source of the exception and to respond accordingly. If the exception can be handled in a non-terminal manner, a transfer of control is made back to the current instruction address.

Figure 4:
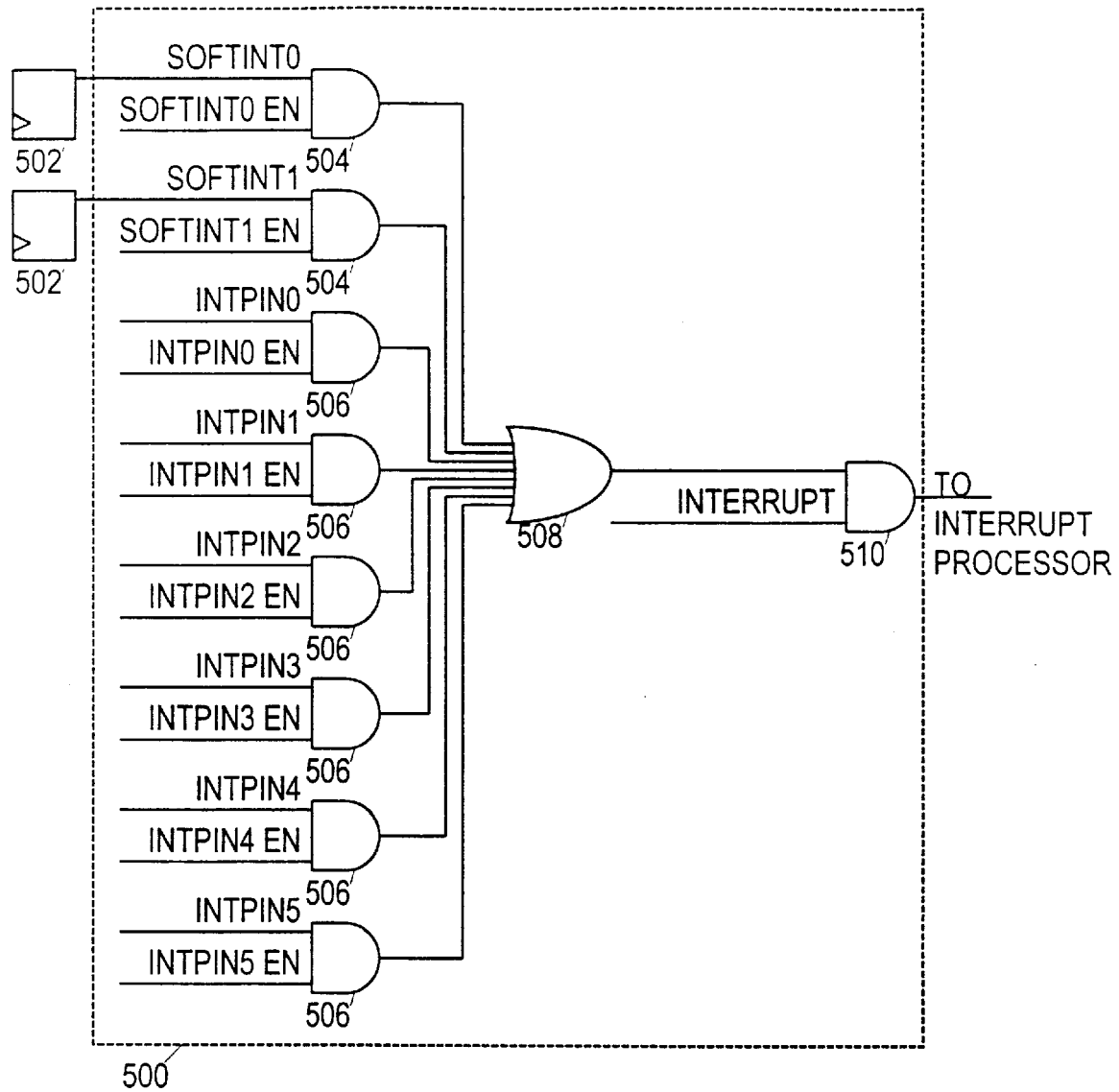
FIG. 4 is a functional block diagram of a conventional interrupt determination module.

Interrupt handler 416 includes interrupt-determination circuitry configured to receive signals from various interrupt generators, to mask individual signals according to various enable signals, and to provide a suppressible single interrupt signal indicative of the need for an exception. Turning now to FIG. 4, a conventional interrupt determination module is shown. The interrupt determination module 500 is coupled to flip-flops 502 which are software set-able bits representing software interrupts SOFTINT0 and SOFTINT1. Interrupt determination module 500 is also coupled to interrupt pins to receive external hardware interrupt signals INTPIN0, INTPIN1, INTPIN2, INTPIN3, INTPIN4, and INTPIN5. Included in interrupt determination module 500 are software interrupt mask units 504 and hardware interrupt mask units 506. Each mask unit receives an interrupt signal and a corresponding interrupt enable signal, and asserts an enabled interrupt signal only if both input signals are asserted. Interrupt determination module 500 also includes an interrupt combiner 508 which receives all the enabled interrupt signals and asserts a combined interrupt signal if any one of the enabled interrupts are asserted. Interrupt determination module 500 further includes an interrupt suppression unit 510 which receives the combined interrupt signal and an interrupt enable signal and asserts a global interrupt signal only if both the input signals are asserted. It is noted that the interrupt enable signal may be equivalently expressed as an inverted interrupt suppression signal. As discussed before, use of interrupt determination module 500 may lead to indeterminate operation of processor core 202 since brief interrupt assertions may be removed before an exception occurs.

Figure 5:
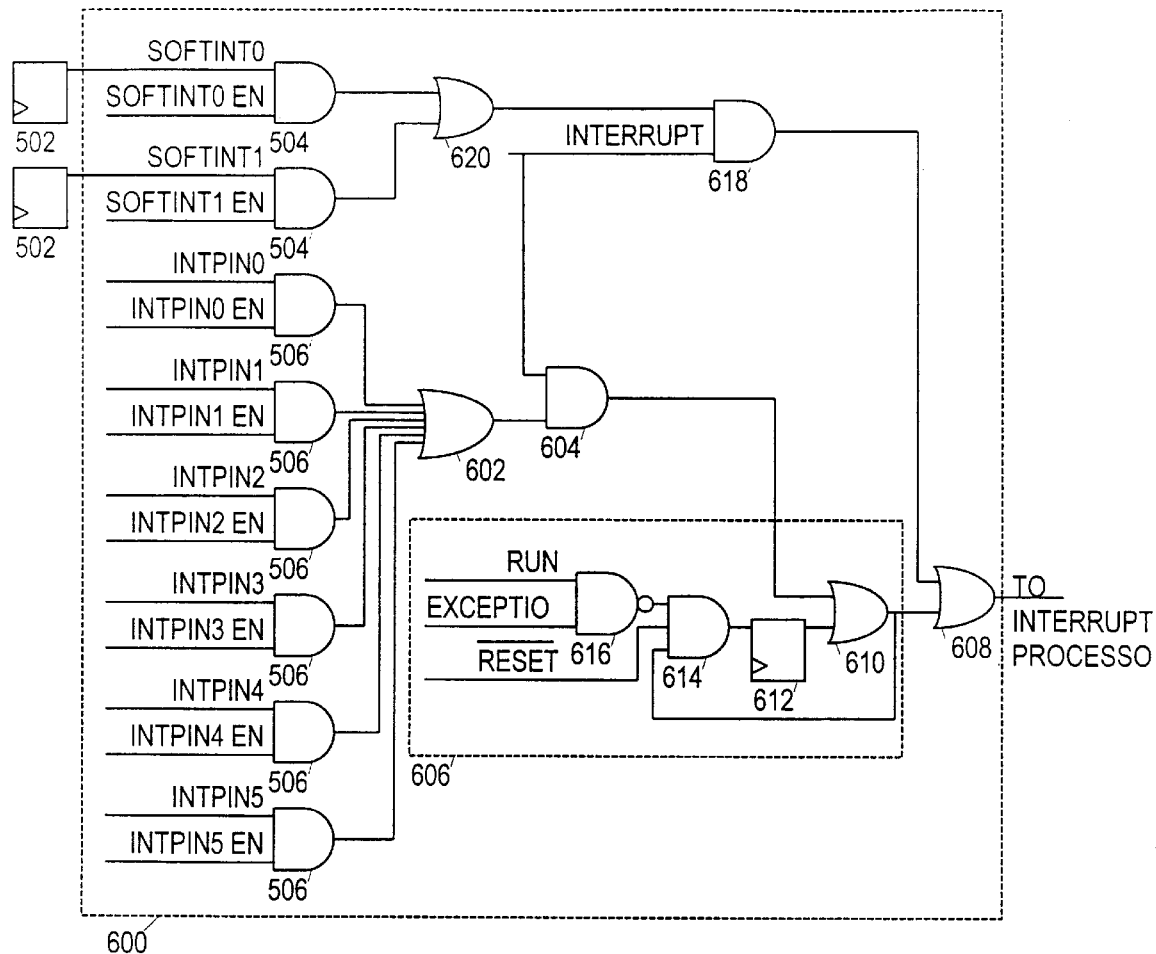
FIG. 5 is a functional block diagram of an interrupt determination module with an interrupt capture and hold mechanism.

Turning now to FIG. 5, an improved interrupt determination module 600 is shown. In interrupt determination module 600, a hardware interrupt combiner 602 receives all the enabled hardware interrupts from hardware interrupt mask units 506 and asserts a hardware interrupt signal if any of the enabled hardware interrupts are asserted. A hardware interrupt suppression unit 604 receives the hardware interrupt signal and an interrupt enable signal and asserts an unsuppressed hardware interrupt signal if both input signals are asserted. It is noted that the interrupt enable signal may be expressed as an inverted interrupt suppression signal. An interrupt acceptance module 606 receives the unsuppressed hardware signal and provides an accepted interrupt signal. The accepted interrupt signal is latched in an asserted state if the unsuppressed hardware interrupt signal is asserted when a capture signal is asserted. When the capture signal is a clock signal, this ensures that an interrupt signal that is asserted during a clock edge is held for at least one complete clock cycle. In any case, the interrupt signal should be held for at least the time required for all modules to recognize it. A global interrupt determination unit 608 receives the accepted interrupt signal and an unsuppressed software interrupt signal and asserts a global interrupt signal if either input is asserted. The unsuppressed software interrupt signal may be provided by a software interrupt suppression unit 618 which receives a software interrupt signal and the interrupt enable signal and asserts the unsuppressed software interrupt signal when both input signals are asserted. The software interrupt signal may be provided by a software interrupt combiner 620 which receives all the enabled software interrupt signals from the software interrupt mask units 504 and asserts the software interrupt signal if any of the input signals are asserted.

In one embodiment, the interrupt acceptance module may include an output unit 610 which receives the unsuppressed hardware interrupt signal and a detected interrupt signal and asserts the accepted interrupt signal if either of the input signals are asserted. The detected interrupt signal may be provided by a latch 612 which receives a detectable interrupt signal and a capture signal and latches the detected interrupt signal in an asserted state if the detectable interrupt signal is asserted when the capture signal is asserted. The capture signal can be a clock signal. The detectable interrupt signal may be provided by a condition unit 614 which receives the accepted interrupt signal and one or more condition signals and asserts the detectable interrupt signal only if all the input signals are asserted. In one embodiment, the condition signals are: an inverted reset signal and an inverted exception signal. The inverted reset signal is de-asserted when a processor reset occurs, and the inverted exception signal is de-asserted when an exception occurs. Either of these clears the latch, since the interrupt signal no longer needs to be latched. When an exception occurs, the processor can no longer be forced into an indeterminate state due to a too-brief interrupt signal assertion. In another embodiment, additional condition units 616 may be added to provide for more complex latch-release conditions.

The use of an interrupt acceptance unit 606 advantageously provides an enforcement of the condition that an interrupt which begins to trigger an exception be held long enough to force the complete transfer of control to the exception handling routine. Once an exception has been taken, the interrupt may be removed at any time by the interrupt generator (the latch is released upon the complete initiation of the exception) without causing non-deterministic behavior. Should the interrupt be removed before the exception routine determines the cause, this would then merely be handled as a spurious interrupt, and the exception terminated. This last feature provides a significant advantage over edge-triggered interrupts in that a spurious interrupt does not need to be treated as a valid interrupt with all the associated overhead.

In accordance with the above disclosure, a pipelined processor core has been described which includes an interrupt sample and hold mechanism to provide robustness for the processor transition from the program control flow to the exception control flow. The interrupt sample and hold mechanism is reset once the processor has fully entered the exception state to allow the removal of the interrupt signal by the interrupt generator if the interrupt is spurious. In this manner the processor may be prevented from entering an indeterminate state due to an invalidly asserted interrupt signal.

Numerous variations and modifications will become apparent to those skilled in the art once the above disclosure is fully appreciated. For example, the interrupt capture and hold mechanism has been described in the context of a pipelined processor, but could equally well be applied to a simple or superscalar processor, or even to a multiprocesser system. It is intended that the following claims be interpreted to embrace all such variations and modifications.

What is claimed is:

1. A processor which robustly handles interrupt requests, wherein the processor comprises:
an interrupt acceptance module configured to provide a global interrupt signal and configured to latch the global interrupt signal in an asserted state if an enabled interrupt is asserted while a capture signal is asserted, wherein the interrupt acceptance module is configured to receive an unsuppressed hardware interrupt signal and to responsively produce an accepted interrupt signal, wherein the accepted interrupt signal is latched in an asserted state if the unsuppressed hardware interrupt signal is asserted when said capture signal is asserted, wherein the interrupt acceptance module includes an output unit coupled to received the unsuppressed hardware interrupt signal and a detected interrupt signal and configured to assert the accepted interrupt signal when either of the unsuppressed hardware interrupt signal and the detected interrupt signal are asserted;
a program counter register configured to specify an address of an instruction to be executed;
an interrupt handler coupled to the interrupt acceptance module to receive the global interrupt signal, and coupled to the program counter register to responsively store a return instruction address from the program counter register and to responsively provide an interrupt instruction address to the program counter register; and
a global interrupt determination unit coupled to receive the accepted interrupt signal and an unsuppressed software interrupt signal and configured to responsively assert the global interrupt signal when either of the accepted interrupt signal and the unsuppressed software interrupt signal are asserted.

2. The processor of claim 1, wherein the interrupt acceptance module further includes a latch coupled to receive a detectable interrupt signal and a capture signal and configured to latch the detected interrupt signal if the detectable interrupt signal is asserted when the capture signal becomes asserted.

3. The processor of claim 2, wherein the interrupt acceptance module also includes a condition unit coupled to receive the accepted interrupt signal and at least one condition signal and configured to provide the detectable interrupt signal only if both the accepted interrupt signal and the at least one condition signal are asserted.

4. The processor of claim 3, wherein the at least one condition signal is de-asserted by the interrupt handler after the interrupt instruction address is provided to the program counter register.

5. The processor of claim 3, wherein the at least one condition signal is de-asserted by a processor reset signal.

6. A processor which robustly handles interrupt requests, wherein the processor comprises:
an interrupt acceptance module configured to provide a global interrupt signal and configured to latch the global interrupt signal in an asserted state if an enabled interrupt is asserted while a capture signal is asserted, wherein the interrupt acceptance module is configured to receive an unsuppressed hardware interrupt signal and to responsively produce an accepted interrupt signal, wherein the accepted interrupt signal is latched in an asserted state if the unsuppressed hardware interrupt signal is asserted when said capture signal is asserted;
a program counter register configured to specify an address of an instruction to be executed;
an interrupt handler coupled to the interrupt acceptance module to receive the global interrupt signal, and coupled to the program counter register to responsively store a return instruction address from the program counter register and to responsively provide an interrupt instruction address to the program counter register;
a global interrupt determination unit coupled to receive the accepted interrupt signal and an unsuppressed software interrupt signal and configured to responsively assert the global interrupt signal when either of the accepted interrupt signal and the unsuppressed software interrupt signal are asserted; and
an interrupt suppression unit coupled to receive a hardware interrupt signal and an interrupt suppression signal and configured to assert the unsuppressed hardware interrupt signal when the hardware interrupt signal is asserted and the interrupt suppression signal is de-asserted.

7. The processor of claim 6, further comprising a hardware interrupt combiner coupled to a plurality of mask units to receive corresponding enabled interrupt signals and configured to assert the hardware interrupt signal if any of the enabled interrupt signals are asserted.

8. The processor of claim 7, wherein the plurality of mask units includes:
a first mask unit configured to receive a first interrupt pin signal and a first interrupt pin enable signal and configured to assert an enabled first interrupt signal only while both the first interrupt pin signal and the first interrupt pin enable signal are asserted; and
a second mask unit configured to receive a second interrupt pin signal and a second interrupt pin enable signal and configured to assert an enabled second interrupt signal only while both the second interrupt pin signal and the second interrupt pin enable signal are asserted.

9. A processor which robustly handles interrupt requests, wherein the processor comprises:
an interrupt acceptance module configured to provide a global interrupt signal and configured to latch the global interrupt signal in an asserted state if an enabled interrupt is asserted while a capture signal is asserted, wherein the interrupt acceptance module is configured to receive an unsuppressed hardware interrupt signal and to responsively produce an accepted interrupt signal, wherein the accepted interrupt signal is latched in an asserted state if the unsuppressed hardware interrupt signal is asserted when said capture signal is asserted;
a program counter register configured to specify an address of an instruction to be executed;

an interrupt handler coupled to the interrupt acceptance module to receive the global interrupt signal, and coupled to the program counter register to responsively store a return instruction address from the program counter register and to responsively provide an interrupt instruction address to the program counter register;

a global interrupt determination unit coupled to receive the accepted interrupt signal and an unsuppressed software interrupt signal and configured to responsively assert the global interrupt signal when either of the accepted interrupt signal and the unsuppressed software interrupt signal are asserted; and a second interrupt suppression unit coupled to receive a software interrupt signal and an interrupt suppression signal and configured to assert the unsuppressed software interrupt signal when the software interrupt signal is asserted and the interrupt suppression signal is de-asserted.

10. A processor which robustly handles interrupt requests, wherein the processor comprises:

an interrupt acceptance module configured to provide a global interrupt signal and configured to latch the global interrupt signal in an asserted state if an enabled interrupt is asserted while a capture signal is asserted, wherein the interrupt acceptance module is configured to receive an unsuppressed hardware interrupt signal and to responsively produce an accepted interrupt signal, wherein the accepted interrupt signal is latched in an asserted state if the unsuppressed hardware interrupt signal is asserted when said capture signal is asserted;

a program counter register configured to specify an address of an instruction to be executed;

an interrupt handler coupled to the interrupt acceptance module to receive the global interrupt signal, and coupled to the program counter register to responsively store a return instruction address from the program counter register and to responsively provide an interrupt instruction address to the program counter register;

a global interrupt determination unit coupled to receive the accepted interrupt signal and an unsuppressed software interrupt signal and configured to responsively assert the global interrupt signal when either of the accepted interrupt signal and the unsuppressed software interrupt signal are asserted; and a software interrupt combiner coupled to a second plurality of mask units to receive corresponding enabled interrupt signals and configured to assert the software interrupt signal when any of the enable interrupt signals is asserted.

11. A processor including an interrupt capture and hold circuit, said interrupt capture and hold circuit comprising:

an interrupt acceptance circuit coupled to receive a hardware interrupt signal and configured to generate an accepted interrupt signal;

a program counter register configured to specify the address of an instruction to be executed;

an interrupt handler coupled to the interrupt acceptance module and to the program counter register, wherein the interrupt handler is configured to store an interrupt instruction address within the program counter register in response to an assertion of said accepted interrupt signal;

wherein the interrupt acceptance circuit includes:

a conditional latching circuit configured to conditionally store an indication of an assertion of said hardware interrupt signal depending upon a condition signal and only if said hardware interrupt signal is asserted during a clock edge; and output logic coupled to said conditional latching circuit and configured to generate said accepted interrupt signal depending upon said hardware interrupt signal and upon a stored state of said conditional latching circuit.

12. The processor as recited in claim 11, wherein the conditional latching circuit includes a latch for storing said stored state.

13. The processor as recited in claim 11, wherein said hardware interrupt signal is a composite hardware interrupt signal, wherein said interrupt capture and hold circuit further comprises input logic coupled to receive a plurality of individual hardware interrupt signals and is configured to generate said composite hardware interrupt signal indicative of an assertion of any of said independent hardware interrupt signals.

14. The processor as recited in claim 11, wherein the condition signal is dependent upon an exception signal, wherein the exception signal is indicative of an occurrence of an exception.

15. The processor as recited in claim 11, wherein the condition signal is further dependent upon a reset signal, wherein the reset signal indicates when a processor reset occurs.

16. The processor as recited in claim 11, wherein said output logic includes an OR gate having a first input coupled to receive stored state of said conditional latching circuit and a second input coupled to receive hardware interrupt signal.

17. The processor as recited in claim 11, wherein said interrupt capture and hold circuit further comprises a logic circuit coupled to receive said accepted interrupt signal and a software interrupt signal, wherein said logic circuit is configured to generate a global interrupt signal dependent upon said accepted interrupt signal, and wherein said interrupt handler stores said interrupt instruction address within the program counter register in response to assertion of either said accepted interrupt signal or of said software interrupt signal.

* * * * *